Jan. 20, 1953 K. E. FARR 2,626,315
COMBINATION RADIO AND TELEVISION RECEIVER
Filed Sept. 8, 1950
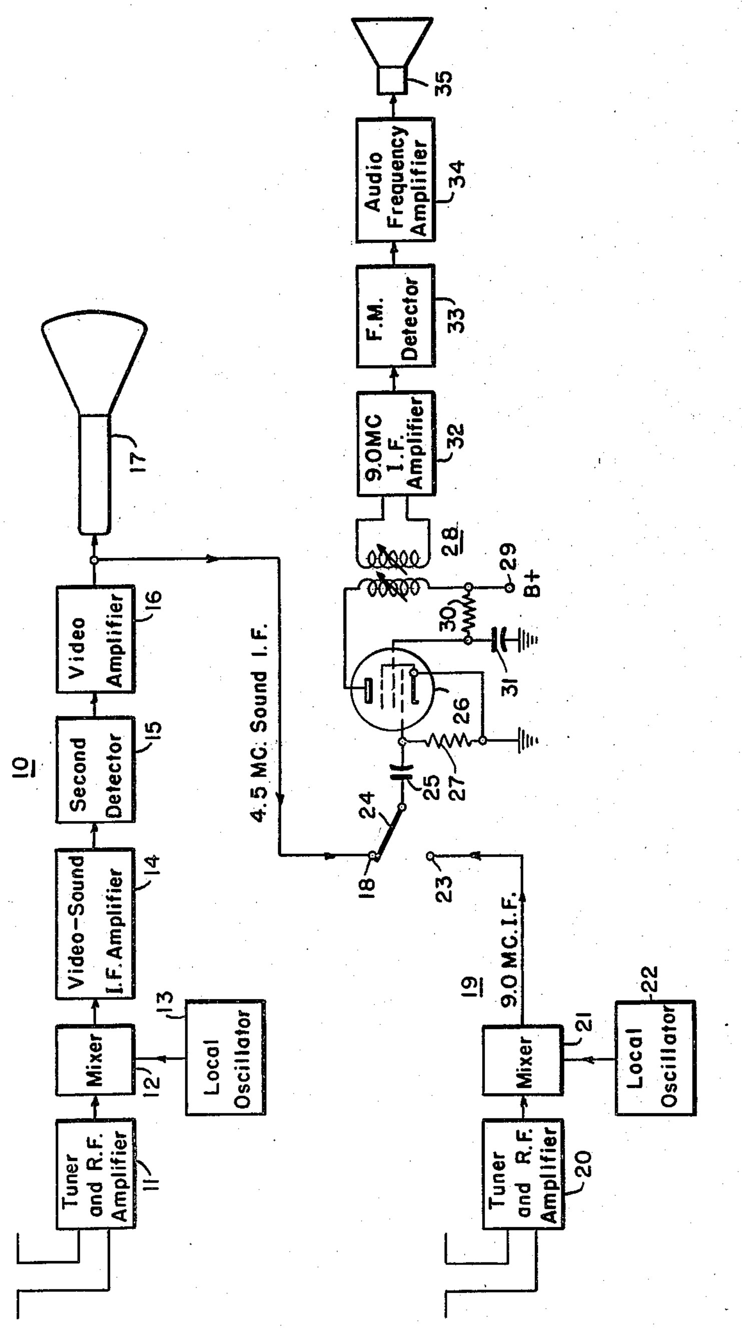
WITNESSES:
E. A. McCloskey
Leon J. Laza
INVENTOR
Kenneth E. Farr.
BY F. E. Browder
ATTORNEY Patented Jan. 20, 1953

2,626,315

UNITED STATES PATENT OFFICE 2,626,315

COMBINATION RADIO AND TELEVISION RECEIVER

Kenneth E. Farr, Paxinos, Pa., assignor to Westinghouse Electric Corporation, East Pittsburgh, Pa., a corporation of Pennsylvania Application September 8, 1950, Serial No. 183,727

6 Claims. (Cl. 178—5.8)

This invention relates to high frequency amplifying circuits, and relates more particularly to a common intermediate frequency amplifier circuit for a television receiver and a frequency modulation broadcast receiver.

Cabinets containing combined television and frequency modulation broadcast receivers are available, but in most cases the only equipment common to both is the audio frequency amplifiers and the loud speakers.

This invention enables a combined television and frequency modulation broadcast receiver to employ the same intermediate frequency amplifier and detector as well as the same audio frequency amplifier and loud speaker.

Present day television transmitters have amplitude-modulated, video carriers and have frequency-modulated, sound carriers which are separated exactly 4.5 megacycles in frequency from the video carriers. In a television receiver, the video carrier and the sound carrier enter the receiver, go through its radio frequency amplifier and enter its mixer where they beat with energy from a local oscillator and provide two intermediate frequencies, one being the difference between the video carrier and the local oscillator frequencies, and the other being the difference between the sound carrier and the local oscillator frequencies.

In a conventional television receiver having an intercarrier sound system, the sound and the video intermediate frequencies are amplified and applied into a second detector where they produce a beat frequency equal to their difference which is 4.5 megacycles and which is a sound intermediate frequency which is amplified in a sound intermediate frequency amplifier, and detected by a frequency modulation detector.

In one embodiment of this invention, the intermediate frequency of a frequency modulation broadcast receiver is 9.0 megacycles, just twice the 4.5 megacycle, sound intermediate frequency from an associated television receiver having an intercarrier sound system. An intermediate frequency amplifier tube has its output circuit tuned to 9 megacycles, and is operated as a class C amplifier so that it generates strong second harmonic voltages in its output circuit. Its control grid is connected through a single-pole, double-throw switch to receive either the 4.5 megacycle sound intermediate frequency from the television receiver or the 9 megacycle intermediate frequency from the frequency modulation broadcast receiver. When the amplifier tube is connected to the television receiver, the 4.5 megacycle signal has its frequency doubled and is amplified and supplied to a common detector. When the amplifier tube is connected to the frequency modulation receiver, it operates as a straight amplifier so that the 9 megacycle signal is amplified and supplied to the common detector.

An advantage of this invention is that in addition to reducing the amount of equipment required, frequency deviations of the television sound signals are doubled, resulting in increased audio output. Another advantage is that the frequency doubler, on television sound signals, can also provide effective amplitude limiting, and interstation noise suppression, through being adjusted to provide no output on signals too weak to double in frequency. Another advantage of the invention is that the relatively high intermediate frequency for the frequency modulation broadcast receiver provides good image rejection on standard frequency modulation broadcast signals in the 88–108 megacycle band.

An object of the invention is to provide a common amplifier for signals from two sources, in which the signal from one source is a multiple of that from the other source.

Another object of the invention is to reduce the components in systems combining television and frequency modulation broadcast reception.

Another object of the invention is to simplify the switching equipment required in a combined television and frequency modulation broadcast receiving system for switching between television and frequency modulation broadcast reception.

Another object of the invention is to reduce the cost of systems combining television and frequency modulation broadcast reception.

Another object of the invention is to provide a common intermediate frequency amplifier, detector, audio-frequency amplifier and sound reproducer for a television receiver and an associated frequency modulation broadcast receiver.

The invention will now be described with reference to the drawing which is a circuit schematic of one embodiment of the invention.

A conventional television receiver 10 which is of the type having an inter-carrier sound system, has a conventional tuner and radio frequency amplifier 11, connected to a conventional mixer 12 to which also is connected a conventional local oscillator 13. The output of the mixer is connected to the input of a conventional intermediate frequency amplifier 14, the output of which is connected to the input of a conventional second detector 15. The output of the detector 15 is connected to the input of a conventional video amplifier 16, the video output of which is supplied into a conventional picture tube 17. The output of the amplifier 16 is also connected to the switch contact 18 for supplying the 4.5 megacycle sound signals thereto.

A frequency modulation broadcast receiver 19 has a conventional tuner and radio frequency amplifier 20 connected to a mixer 21 to which is also connected the local oscillator 22. The receiver 19 is conventional except that its intermediate frequency is 9.0 megacycles, twice that of the sound beat signal from the television receiver. It is connected to supply its 9.0 megacycle intermediate frequency signals to the switch contact 23.

The switch arm 24 is arranged to touch in one position the contact 18, and to touch in its other position the contact 23, and is connected through the coupling capacitor 25 to the control grid of the pentode amplifier tube 26. The control grid of the tube is connected through the grid resistor 27 to its cathode which is grounded. The plate of the tube is connected to one side of the primary winding of the output transformer 28, the other side of which is connected to a positive terminal 29 of a conventional, direct circuit, plate voltage supply source which is not illustrated. The screen grid of the tube is connected through the voltage dropping resistor 30 to the terminal 29, and through the by-pass capacitor 31 to ground. The suppressor grid of the tube is connected to its cathode.

The secondary winding of the transformer 28 may be connected through a conventional, 9.0 megacycle intermediate frequency amplifier 32 to a conventional radio detector 33, although a limiter-discriminator circuit may be used if desired. The output of the detector is connected to a conventional audio-frequency amplifier 34, the output of which is connected to a conventional loud-speaker 35.

The primary and secondary windings of the output transformer 28 are tuned to 9.0 megacycles.

The tube 26 is so biased that it operates on a non-linear portion of its characteristic curve, for example, as a class C amplifier, thus generating strong second harmonic voltages when sufficient input voltages are applied to its control grid. When the switch arm 24 is against the contact 18 connected to the television receiver, the 4.5 megacycle signal voltages from the television receiver are supplied to the control grid of the amplifier tube. Since the output transformer 28 is tuned to 9.0 megacycles, only the second harmonic of the 4.5 megacycle input signal is supplied to the following amplifier 32.

When the switch arm 24 is moved from the contact 18 against the contact 23 connected to the frequency modulation broadcast receiver, the tube 26 acts as a straight amplifier of the 9.0 megacycle signals received from that receiver.

The 9.0 megacycle intermediate frequency is preferable for a frequency modulation receiver operating in the 88–108 megacycle band, since it provides improved image rejection.

Doubling the frequency of the 4.5 megacycle signals from the television receiver provides increased audio output since the 9.0 megacycle signal in the output of the doubler will have twice the frequency modulation frequency deviations of the 4.5 megacycle input signals.

Weak signals from the television receiver such as those resulting from interstation noise will not be amplified since there will be no output from the doubler from signals too weak to double. Not only does this invention permit an intermediate frequency amplifier and a detector to be common to a television receiver and an associated frequency modulation broadcast receiver, but the switching equipment required is of the simplest form consisting merely in a double-throw, single-pole switch.

I claim as my invention:

1. In combination, a first source of signals having one frequency, a second source of signals having a frequency which is a multiple of said first frequency, an electron discharge device having an input circuit and an output circuit, means for biasing said electron discharge device to operate on a non-linear portion of its characteristic curve so as to generate harmonics of signals applied to its input circuit, the output circuit of said electron discharge device being tuned to the frequency of said second source, and switching means for connecting said input circuit to said first source or alternately to said second source.

2. In combination, a first super-heterodyne receiver having one intermediate frequency, a second super-heterodyne receiver having an intermediate frequency which is a multiple of said one frequency, an amplifier tube having an output circuit tuned to said intermediate frequency of said second receiver, and having an input circuit, means for biasing said tube to operate on a non-linear portion of its characteristic curve whereby it generates harmonics of frequencies applied to said input circuit, and switching means for connecting said input circuit to said first receiver or alternatively to said second receiver.

3. In combination, a television receiver having an inter-carrier, frequency modulated, sound intermediate frequency, a frequency modulation broadcast receiver having an intermediate frequency which is a multiple of said inter-carrier intermediate frequency, an intermediate frequency amplifier tube having an output circuit tuned to said intermediate frequency of said broadcast receiver, and having an input circuit, means for biasing said tube to operate on a non-linear portion of its characteristic curve so as to generate harmonics of signals applied to its input circuit, and switching means for connecting said input circuit to said television receiver or alternatively to said broadcast receiver.

4. In combination, a television receiver having an inter-carrier, frequency modulated, sound intermediate frequency, a frequency modulation broadcast receiver having an intermediate frequency which is a multiple of said inter-carrier intermediate frequency, an intermediate frequency amplifier tube having an output circuit tuned to said intermediate frequency of said broadcast receiver, and having an input circuit, means for biasing said tube to operate on a non-linear portion of its characteristic curve so as to generate harmonics of signals applied to said input circuit, a detector connected to said output circuit, and switching means for connecting said input circuit to said television receiver or alternatively to said broadcast receiver.

5. The invention claimed in claim 4 in which an audio-frequency amplifier is connected to the detector, and a sound reproducer is connected to the audio-frequency amplifier.

6. A television and frequency modulation broadcast receiving system comprising a super-heterodyne, television receiver having an inter-carrier, frequency modulated, sound intermediate frequency, a super-heterodyne, frequency modulation broadcast receiver having an intermediate frequency which is a multiple of said inter-carrier, intermediate frequency, an intermediate frequency amplifier tube having an output circuit tuned to said intermediate frequency of said broadcast receiver, and having an input circuit, means for biasing said tube to operate on a non-linear portion of its characteristic curve so as to generate harmonics of signals applied to said input circuit, a frequency modulation detector connected to said output circuit, an audio-frequency amplifier connected to said detector, a sound reproducer connected to said audio-frequency amplifier, and switching means for connecting said input circuit to said television receiver or alternatively to said broadcast receiver.

KENNETH E. FARR.

REFERENCES CITED

The following references are of record in the file of this patent:

UNITED STATES PATENTS

| Number | Name | Date |
|---|---|---|
| 2,155,126 | Goldmark | Apr. 18, 1939 |
| 2,186,455 | Goldmark | Jan. 9, 1940 |
| 2,528,222 | Foster | Oct. 31, 1950 |